US008070589B2

(12) United States Patent
Macke

(10) Patent No.: US 8,070,589 B2
(45) Date of Patent: Dec. 6, 2011

(54) SKILL-BASED REDEMPTION GAME

(75) Inventor: Michael M. Macke, Duluth, GA (US)

(73) Assignee: Cadillac Jack, Inc., Duluth, GA (US)

( * ) Notice: Subject to any disclaimer, the term of this patent is extended or adjusted under 35 U.S.C. 154(b) by 931 days.

(21) Appl. No.: 12/051,046

(22) Filed: Mar. 19, 2008

(65) Prior Publication Data

US 2009/0239601 A1 Sep. 24, 2009

(51) Int. Cl.
*A63F 13/00* (2006.01)

(52) U.S. Cl. .................... 463/20; 463/7; 463/9; 463/16; 463/17; 463/18; 463/19

(58) Field of Classification Search .................. 463/7, 9, 463/16–20
See application file for complete search history.

(56) References Cited

U.S. PATENT DOCUMENTS 5,494,294 A 2/1996 Cappetta
5,816,918 A * 10/1998 Kelly et al. .................... 463/16
7,025,674 B2 * 4/2006 Adams et al. .................... 463/1
7,063,617 B2 * 6/2006 Brosnan et al. ................ 463/25
7,179,166 B1 2/2007 Abbott
2004/0048650 A1 3/2004 Mierau et al.

* cited by examiner

*Primary Examiner* — Dmitry Suhol
*Assistant Examiner* — David Duffy
(74) *Attorney, Agent, or Firm* — Greenberg Traurig

(57) ABSTRACT

A skill-based redemption gaming machine in which a plurality of game symbols are arranged on a plurality of slot machine-type reels is configured to ensure that player awards comply with statutory guidelines. A player deposits consideration into the gaming machine and receives a corresponding number of plays and points, representing the number of available game plays and wager amounts, respectively. The player places a wager up to the number of available points which, upon commencement of play, are deducted from the total points value. Upon commencing play, the player is provided free replays or the opportunity to nudge one or more electronically displayed reels in an effort to obtain a certain alignment of game symbols. If such alignment is obtained, the player is presented with points and awards pursuant to a paytable, said rewards being redeemable for non-cash prizes.

20 Claims, 13 Drawing Sheets

FIG. 7
102
302
300
300
300
304
305
501
503
507
303
509
308
PLAYS
78
POINTS
1230
POINTS WON
80
AWARDS
300
AWARDS WON
100
PAYLINE
REPLAYS
3
BET +
50
BET -
RAISE
RAISE
RAISE
LOWER
LOWER
LOWER
POINTS/AWARDS
1000/200
550/200
80/100
BONUS
REPLAYS

FIG. 10
102
Touch a LUCKY POT to discover your prize!
1000/200
1001
PLAYS
77
POINTS
2130
POINTS WON
1000
AWARDS
500
AWARDS WON
200
PAYLINE
REPLAYS
BET +
50
BET -
304
305
501
503
507
303
509
308

SKILL-BASED REDEMPTION GAME

TECHNICAL FIELD

The present invention relates generally to a game machine and, more particularly, to a redemption game machine in which the result is based upon the skill of the player rather than chance.

BACKGROUND OF THE INVENTION

Under federal law, gambling in the United States is regulated by the individual states, which have the primary responsibility for determining what forms of gaming activities may legally take place within their borders. Each state allowing legalized gambling has enacted its own laws specifying what type of gambling is permissible, where it may be conducted and who may participate. Approximately one-third of the states allow commercial casinos featuring games such as blackjack, slots and roulette. Others have passed legislation permitting alternate gambling operations like card rooms, pari-mutuel wagering and charitable gaming.

Certain states not wishing to authorize such gambling concerns may permit the operation of so-called "redemption games". Redemption games typically require some level of skill and reward a player proportionally to his or her score. Generally, players accumulate credits that can be exchanged for limited-value, non-cash merchandise such as small toys, candy or food items.

One well known skill-based redemption game is a spinning reel game incorporating a "nudge" feature. In such a device, an electronic gaming machine has a video display showing a plurality of slot machine-type reels, each having a plurality of symbols. The player sees three symbols on each reel: the payline position (i.e., the center row of the reels) and the symbol immediately above and immediately below the payline position.

After depositing coins, bills or tickets into the machine, the player commences play, causing the reels to spin independent of one another. If the combination of symbols along the payline matches one of a predetermined set of winning combinations, the player is awarded a prize. The winning combinations are presented to the player on the display, usually next to the leftmost or rightmost reel. If, however, a winning combination is not achieved after the initial spin, the player is given the opportunity to "nudge" one or more of the reels (i.e., causing it to rotate up or down) in an attempt to achieve a winning combination.

This type of nudge game involves skill because the player might fail to nudge a reel in the proper direction to obtain an available winning combination. Alternatively, the player may nudge a winning combination off the payline. Certain nudge redemption games of this type do not allow a winning combination of reels symbols to appear along the payline after the initial spin. This ensures that the player can only win an award through the use of skill and not through pure chance.

Because redemption games are not intended to be a substitute for traditional gambling devices, strict limitations on the value of the awards they pay are typically put in place. For example, the statute of one jurisdiction authorizing the use of redemption games limits awards to $5 per "single play". The challenge then becomes tracking the number of single plays occurring on the redemption games to ensure that the statutory limitation on award payouts has not been exceeded.

Accordingly, there is a need for a redemption gaming machine that accurately tracks the number of plays occurring to ensure that the limit on prize awards has not been exceeded.

SUMMARY OF THE INVENTION

The present invention relates to a skill-based redemption gaming machine having slot machine-type spinning reels configured to ensure that player awards comply with statutory guidelines. A player deposits consideration into the gaming machine and receives a corresponding number of plays and points, representing the number of available game plays and wager amounts, respectively. The player places a wager up to the number of available points which, upon commencement of play, are deducted from the total points value. Upon commencing play, the player is provided free replays or the opportunity to nudge one or more electronically displayed reels in an effort to obtain a certain alignment of game symbols. If such alignment is obtained, the player is presented with points and awards pursuant to a paytable, said rewards being redeemable for non-cash prizes.

In one embodiment of the present invention, there is disclosed an electronic skill-based redemption game comprising a display; a computer processor; means for generating a plurality of reels on the display with each of the reels having a plurality of symbols. A memory stores a plurality of software instructions, a database of winning combinations of symbols and prize information corresponding to the winning combinations. A payline designates certain of the symbols for comparison to the winning combinations. The gaming machine also includes means for accepting consideration in response to which the player is provided with a plays value and a points value. The plays value corresponds to the number of times the player can commence play of the gaming machine while the points value governs the amount of wagers the player may make. To play the gaming machine, the player indicates a wager up to the available number of points and commences play through a game activation means, thereby causing the processor to implement the following software instructions: (i) decrementing the plays value by one and the points value by the amount of the wager; (ii) simulating the rotation of the plurality of reels on the display by varying the position of the plurality of symbols on the plurality of reels; (iv) providing compensation to the player in accordance with the paytable if the plurality of symbols designated by the means for designating at least one of the plurality of symbols on each of the plurality of reels matches the at least one winning combination of symbols; and (v) terminating further play of the skill-based redemption game if the plays value reaches zero.

In another embodiment of the present invention, the compensation provided to the player is an awards amount.

In yet another embodiment of the present invention, the compensation provided to the player is a points amount.

In yet another embodiment of the present invention, the compensation provided to the player is an opportunity to play a bonus round depicted on the display.

In yet another embodiment of the present invention, the gaming machine further comprises player controlled cash-out means upon activation of which the player is given the option of converting a portion of the awards amount to additional points.

In yet another embodiment of the present invention, the gaming machine further comprises player controlled nudge means for altering the position of the plurality of symbols on the plurality of reels.

In yet another embodiment of the present invention, the compensation provided to the player is one or more replays.

In yet another embodiment of the present invention, for each replay awarded, play of the game is commenced without further input from the player.

In yet another embodiment of the present invention, for each replay, the plays value is not decremented while the points value is decremented by the amount of the most recent wager.

In yet another embodiment of the present invention, the gaming machine further comprises further comprising means for recording and displaying one or more of the top points values theretofore obtained by players of the game.

According to another embodiment of the present invention, there is disclosed a method of playing an electronic skill-based redemption game comprising: generating a plurality of reels on a display, each of the plurality of reels having a plurality of symbols; storing a plurality of software instructions, at least one winning combination of symbols and paytable information corresponding to the at least one winning combination of symbols in memory; accepting consideration from a player and providing the player with a plays value and a points value; accepting a wager from the player in an amount up to the number of points; commencing play of the skill-based redemption game; decrementing the plays value by one and the points value by the amount of the wager; simulating the rotation of the plurality of reels on the display by varying the position of the plurality of symbols on the plurality of reels; providing means for designating at least one of the plurality of symbols on each of the plurality of reels for comparison with the at least one winning combination of symbols; providing compensation to the player in accordance with the paytable if the plurality of symbols designated by the means for designating at least one of the plurality of symbols on each of the plurality of reels matches the at least one winning combination of symbols; and terminating further play of the skill-based redemption game if the plays value reaches zero.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts throughout the several views.

The various embodiments in accordance with the present invention are generally described below as a gaming machine that accurately tracks the number of plays occurring to ensure that the limit on prize awards has not been exceeded. For the sake of illustration and expediency, the following description generally makes reference to a skill-based gaming machine having a nudge feature. However, it will be understood that the methods and devices described herein are equally pertinent to many other applications that incorporate such features.

DETAILED DESCRIPTION

The present disclosure now will be described more fully hereinafter with reference to the accompanying drawings, in which some, but not all of the embodiments are shown. Indeed, the disclosed systems and methods may be embodied in many different forms and should not be construed as limited to the embodiments set forth herein. Rather, these embodiments are provided so that this disclosure will satisfy applicable legal requirements.

Figure 1:
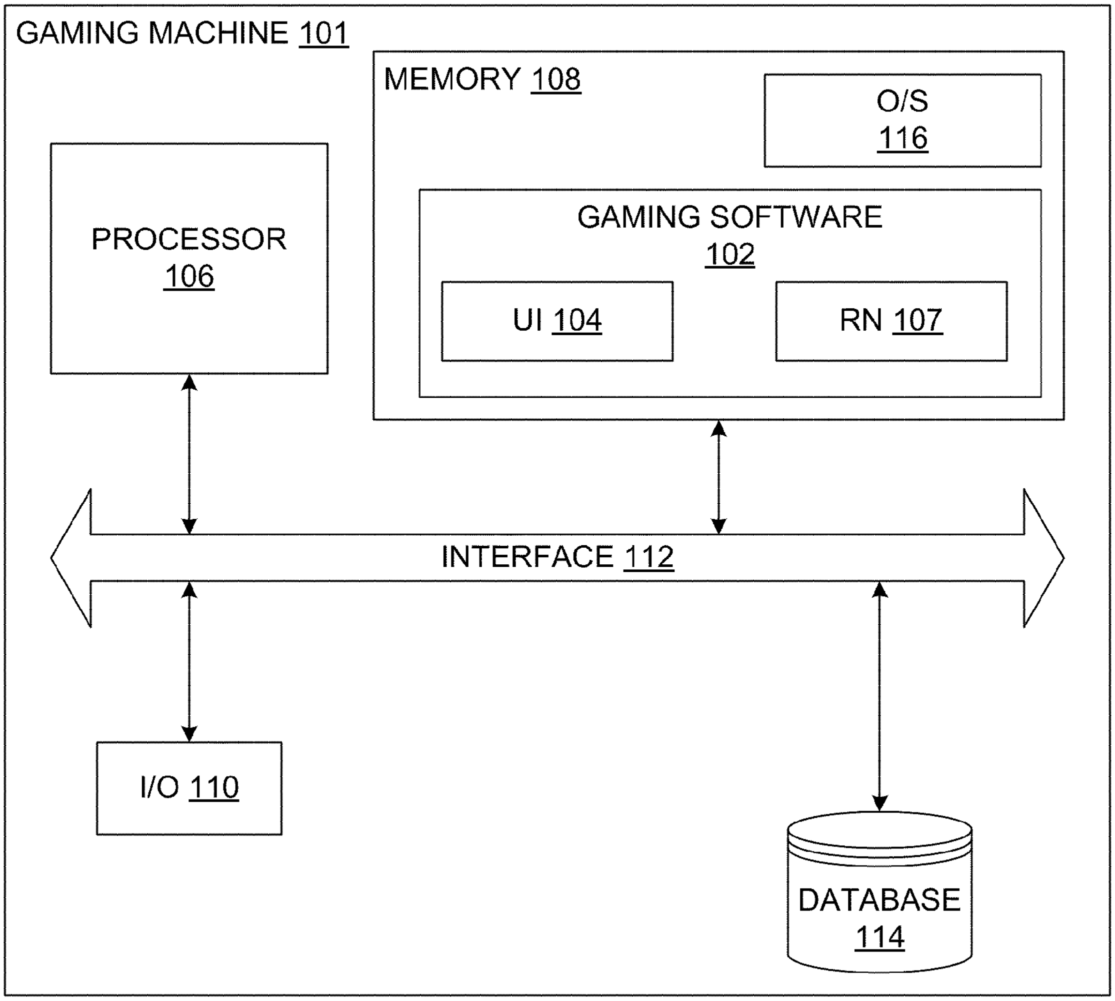
FIG. 1 shows a block diagram of a skill-based redemption gaming machine in accordance with the present invention.

FIG. 1 shows an exemplary gaming machine 101. Generally, in terms of hardware architecture, as shown in FIG. 1, gaming machine 101 includes a processor 106, memory 108, and one or more input and/or output (I/O) devices or peripherals 110 that are communicatively coupled to each other via a local interface 112. The local interface 112 can be, for example, one or more buses or other wired or wireless connections. The local interface 112 may have additional elements (not shown) to enable communications, such as controllers, buffers (caches), drivers, repeaters, and receivers. Further, the local interface 112 may include address, control, and/or data connections to enable appropriate communications among the aforementioned components. The gaming machine 101 can also communicate with a database 114 via local interface 112.

Processor 106 is a hardware device capable of executing software, particularly that stored in memory 108. Processor 106 can be any custom made or commercially available processor, a central processing unit (CPU), a graphics processor (GPU), an auxiliary processor among several processors associated with the gaming machine 101, a semiconductor based microprocessor (in the form of a microchip or chip set), a macroprocessor, or generally any device for executing software instructions.

Memory 108 can include any one or combination of volatile memory elements (e.g., random access memory or RAM)

such as DRAM, SRAM or SDRAM and non-volatile memory elements (e.g., read only memory or ROM) such as hard drive, tape, or CDROM drives. Moreover, memory 108 may incorporate electronic, magnetic, optical, and/or other types of storage media. Note that memory 108 can have a distributed architecture, where various components are situated remote from one another, but can be accessed by the processor 106.

The software in memory 108 may include one or more separate programs, each of which comprises an ordered listing of executable instructions for implementing logical functions. In one example of gaming machine 101, the software in the memory 108 includes a suitable operating system 116 and gaming software 102. Operating system 116 controls the execution of various computer programs, such as gaming software 102, and provides scheduling, input-output control, file/data management, memory management, communication control, and related services.

The software module incorporating gaming software 102 may contain a source program, executable program (i.e., object code), script, and/or any other entity comprising a set of instructions to be performed. In the case of a source program, the program may be translated via a compiler, assembler, interpreter, or the like, which may or may not be included within memory 108, so as to operate properly in connection with the operating system 116. Furthermore, gaming software 102 can be written as an object oriented programming language, which has classes of data and methods, or a procedure programming language, which has routines, subroutines, and/or functions, for example but not limited to, C, C++, Pascal, Basic, Fortran, Cobol, Perl, Java, ASP, and Ada.

I/O driver 110 may be used to drive various I/O devices (not shown) such as a display, keyboard, mouse, scanner, microphone, etc., as well as interfaces to various devices. Furthermore, I/O devices may also include output devices, such as a printer or an audio device. Finally, I/O devices may further include devices that communicate both inputs and outputs, for instance a modulator/demodulator (modem for accessing another device, system, or network), a radio frequency (RF) or other transceiver, a telephonic interface, a bridge, a router, etc.

When gaming machine 101 is in operation, processor 106 is configured to execute software stored within memory 108, to communicate data to and from memory 108, and to generally control operations of the gaming machine 101 pursuant to the software. Gaming software 102 and operating system 116, in whole or in part, but typically the latter, are read by processor 106, perhaps buffered within processor 106, and then executed.

Gaming software 102 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. Gaming software 102 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 2:
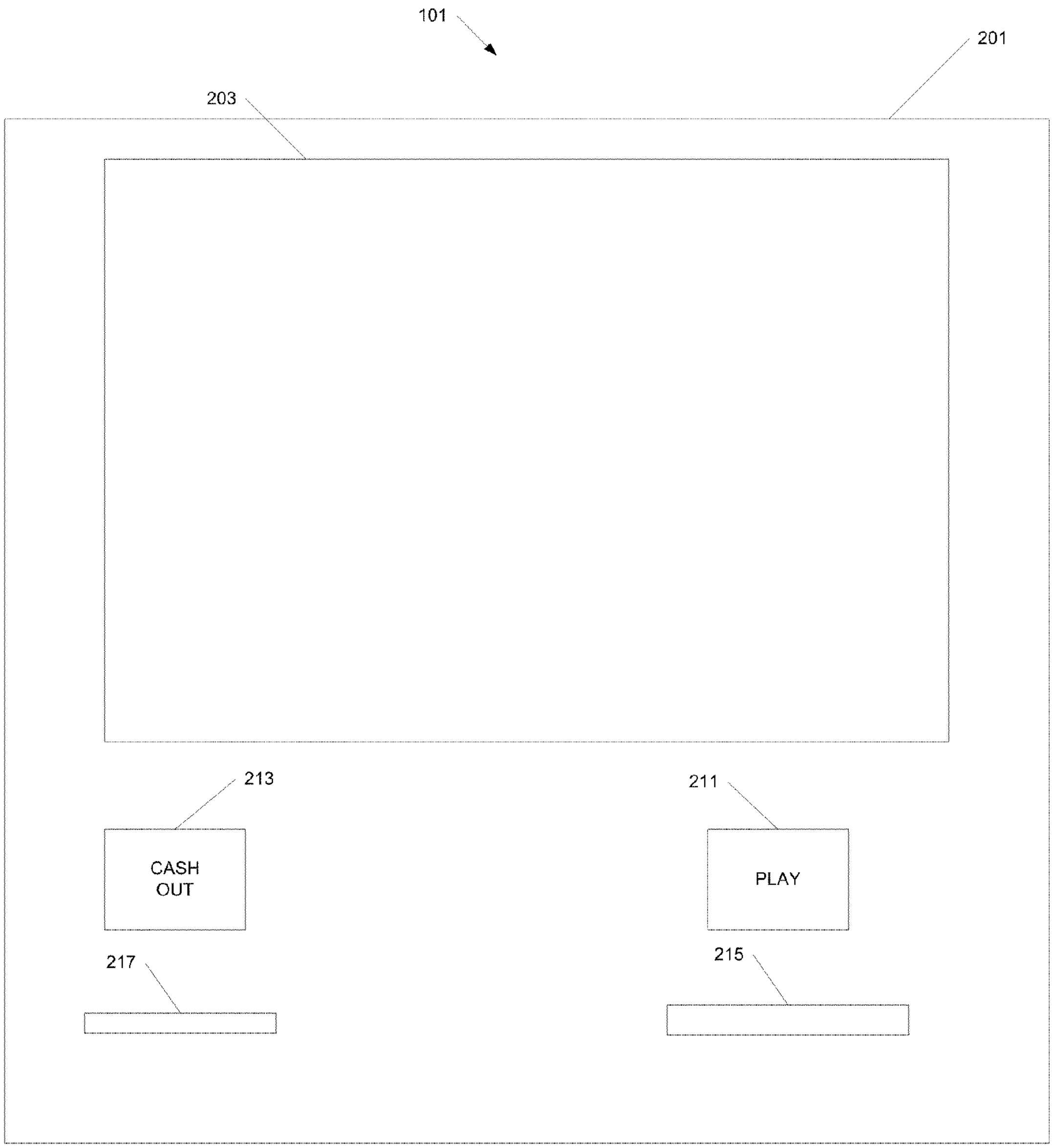
FIG. 2 shows the cabinet of a skill-based redemption gaming machine in accordance with the present invention.

FIG. 2 shows an exemplary gaming machine 101 in accordance with the present invention. The gaming machine 101 includes a cabinet 201 housing a display 203 for displaying game events. Typically, the display 203 is a flat panel LCD monitor. However, any display means known in the art may be employed.

Proximate to display 203 are a series of electromechanical buttons 211, 213 positioned on the cabinet for use as a user interface for controlling game play features such as commencing play 211 and cashing out 213 (i.e., terminating game play and retrieving the monetary value corresponding to the remaining game credits). The specific arrangement and function of each of the electromechanical buttons are dependent upon the specific rules of the game being played on the gaming machine 101.

Gaming machine 101 also includes a wager input interface 215, such as a bill acceptor into which a player inserts paper currency and receives credit on the gaming machine 101 for the amount deposited. In alternate embodiments, the wager input interface 215 can be a ticket reader, a magnetic card reader, or similar mechanisms, into which the player places a ticket or magnetic card encoded with a monetary value purchased from a cashier's station or vending machine. In certain embodiments, gaming machine 101 includes a ticket printer 217. In such a system, when a player indicates his or her intent to retrieve any remaining game credits or currency from gaming machine 101, electromechanical button 213 is depressed and a paper ticket is generated by ticket printer 217. The player may then exchange the ticket for the value printed thereupon or use it for future game play, as described in greater detail below.

Figure 3:
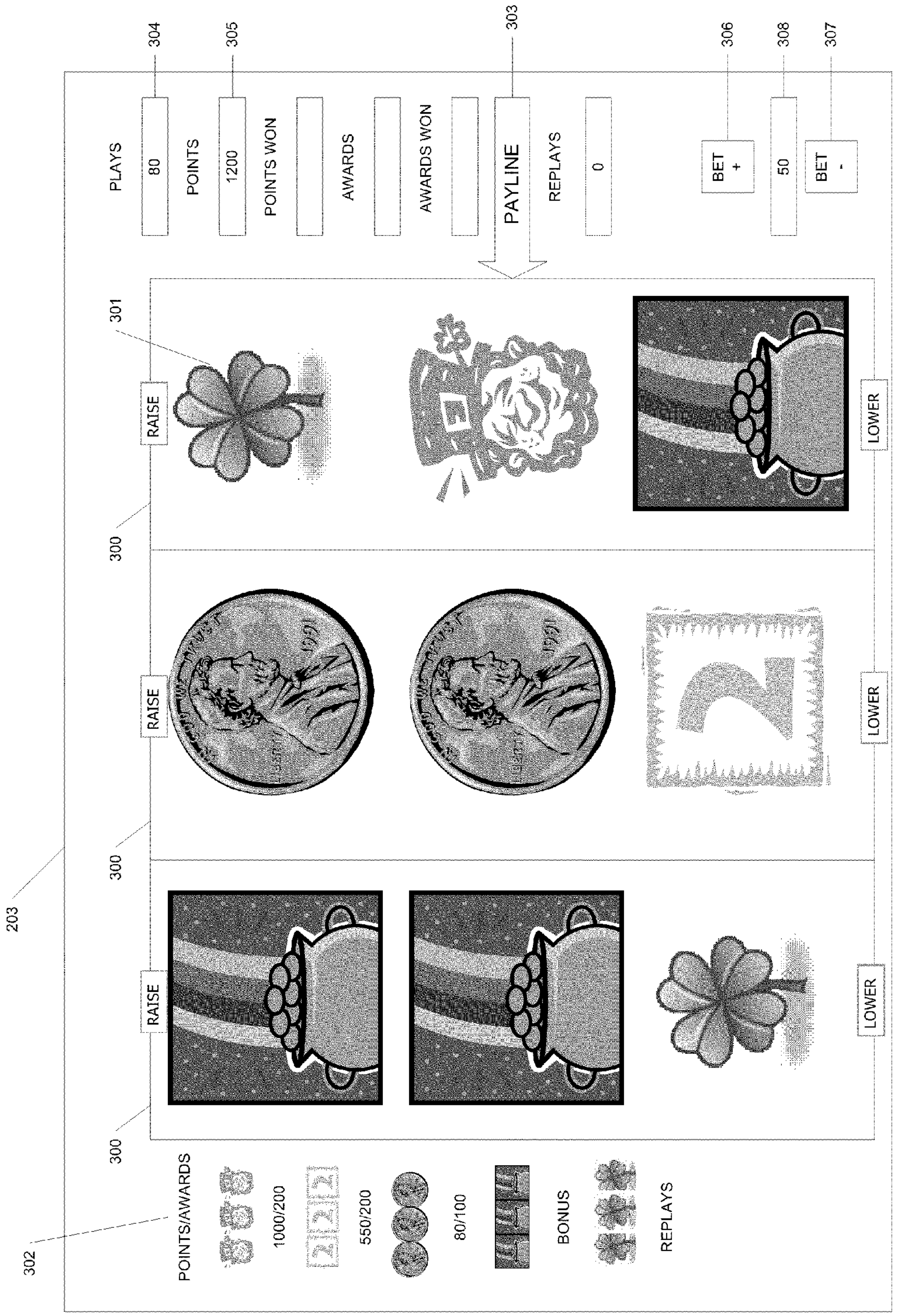
FIG. 3 shows the display of the skill-based redemption gaming machine in accordance with the present invention after money/consideration has been deposited.

Referring to FIG. 3, processor 106, executing gaming software 102 stored in memory 108, causes a plurality of game reels 300 to be presented on display 203, each of which comprises a series of reel symbols 301. Reel symbols 301 are arbitrarily selected and are frequently associated with a game theme. For example, a game having a "St. Patrick's Day" theme may use symbols depicting a pot of gold, rainbows, shamrocks and leprechauns. As game reels 300 rotate during play, a plurality of reel symbols 301 will be visible to the player. Typically, three symbols on each reel will be displayed. In operation, the symbols will move from top to bottom on each reel in order to simulate slot machine-type mechanical reels in motion.

Also present on display 203 is paytable 302, which shows the prize awarded for obtaining certain combinations of reel symbols across payline 303, as described in greater detail below. For example, as shown in FIG. 3, a player will receive 1,000 points and 200 awards for obtaining three leprechauns across payline 303. Alternatively, the player will receive 550 points and 200 awards for aligning three pennies across payline 303. Typically, paytable 302 is continuously displayed during play of the gaming machine, thereby allowing the player to constantly identify winning combinations. Alternatively, paytable 302 may be contained on a help screen, on printed material mounted on cabinet 201 or displayed in other manners known in the art.

To commence play, a player deposits consideration in the form of cash or tickets into wager input interface 215. In response, processor 106 causes plays indicator 304 and points indicator 305 to display the number of plays and points, respectively, corresponding to the consideration deposited.

The value indicated by plays indicator 304 reflects the number of game plays the player has available (i.e., how many times he or she may set the game reels in motion). Alternatively, points indicator 305 identifies the number of points the player has to wager without the need to provide additional consideration. Accordingly, if a player has plays remaining on plays indicator 304 but no points remaining on points indicator 305, he or she may continue to play the game for pure enjoyment without making a wager and without being eligible to win an award. Conversely, if the player has points available on points indicator 305 but no plays remaining on plays indicator 304, he or she may not play the game further without depositing additional consideration or converting points to plays, as discussed below. The numerical relationship between plays and points is a function of game design as programmed into gaming software 102.

Again referring to FIG. 3, after depositing consideration, the player has been given 80 plays and 1200 points, as indicated by plays indicator 304 and points indicator 305. Accordingly, in this embodiment, one play is the equivalent of 15 points. For example, if the player has deposited $20 in consideration into gaming machine 101, each play is worth $0.25 while each point is valued at $0.0167. The specific relationship between points, plays and consideration is a function of game design governed by the applicable gaming laws.

Once consideration has been deposited, the player selects the number of points he or she wishes to wager using wager increase and/or wager decrease keys, 306 and 307, respectively. The number of points selected to be wagered is displayed by wager indicator 308, which may not exceed the number of points available, as indicated on points indicator 305. In the embodiment illustrated by FIG. 3, wager indicator 308 show that the player has elected to place a bet equal to 50 points.

Once the player selects a wager amount, play of the game is commenced by depressing the play button 211 on cabinet 201, setting game reels 300 in motion, simulating the movement of spinning mechanical reels. In one embodiment of the present invention, game reels 300 will stop automatically after a predetermined period of time or amount of rotation. Alternatively, gaming software 102 can be programmed to have a "stop" feature in which the player must cause the game reels to cease rotating, either all at once or individually, using means known in the art.

Figure 4:
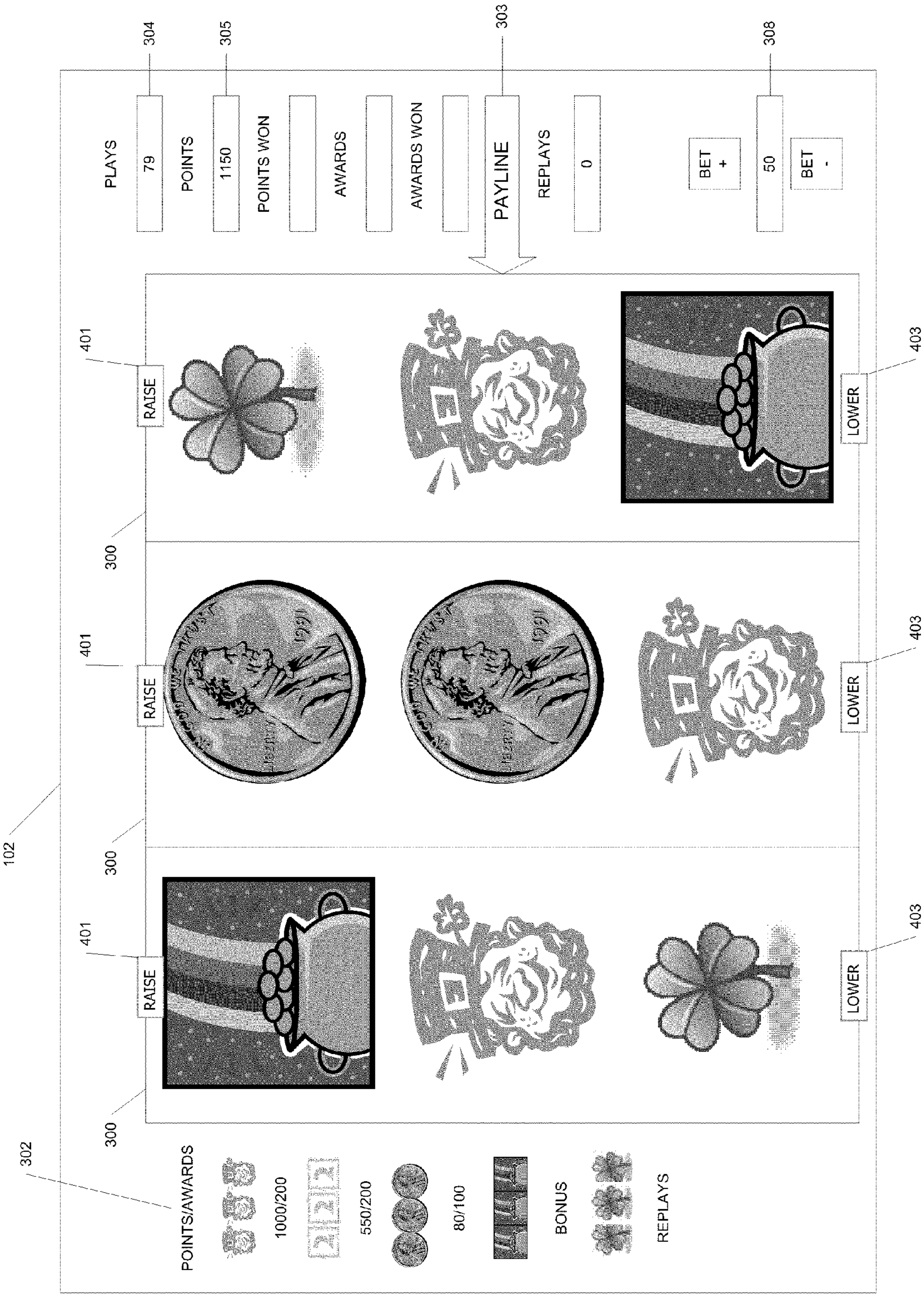
FIG. 4 shows the display of the skill-based redemption gaming machine in accordance with the present invention with a winning combination available.

FIG. 4 depicts display 203 of gaming machine 101 after the player has placed a wager of 50 points and commenced play and game reels 300 have come to rest. Plays indicator 301 has been adjusted to reflect that one play has been consumed. Likewise, points indicator 302 has been reduced by the 50 points bet. The player is now given the opportunity to nudge (i.e., raise or lower) one of game reels 300, using raise or lower activators, 401 and 403, respectively, in an effort to create one of the winning patterns identified in paytable 302 along payline 303.

As can be seen in FIG. 4, an image of a leprechaun appears in the center row of the outer two game reels and on the bottom row of the center game reel. If the player elects to depress raise activator 401 to raise the center game reel, he or she will have successfully arranged three leprechauns along payline 303, thus earning 1000 points and 200 awards according to paytable 302.

Figure 5:
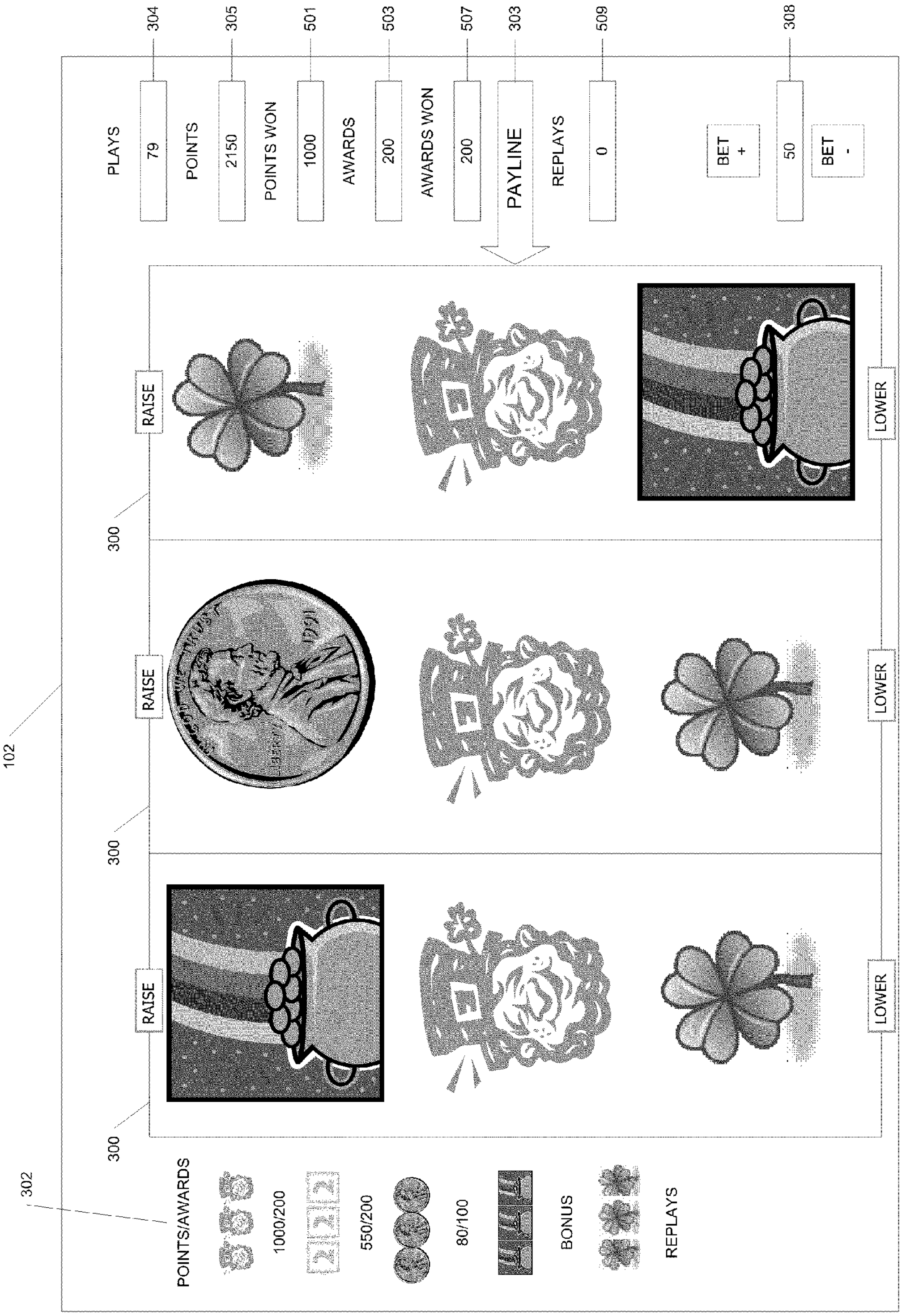
FIG. 5 shows the display of the skill-based redemption gaming machine in accordance with the present invention after the reels have been nudged to achieve the winning combination.

FIG. 5 depicts display 102 after the player has successfully adjusted the center game reel to form a winning combination across payline 303. Points won indicator 501 reflects the 1000 points the player has been awarded for arranging three leprechauns across payline 303, while points indicator 305 is augmented to display the total of the player's available points (i.e., 2150). Similarly, awards won indicator 507 reflects the 200 awards the player has won while awards indicator 503 shows the total awards the player has available.

Figure 6:
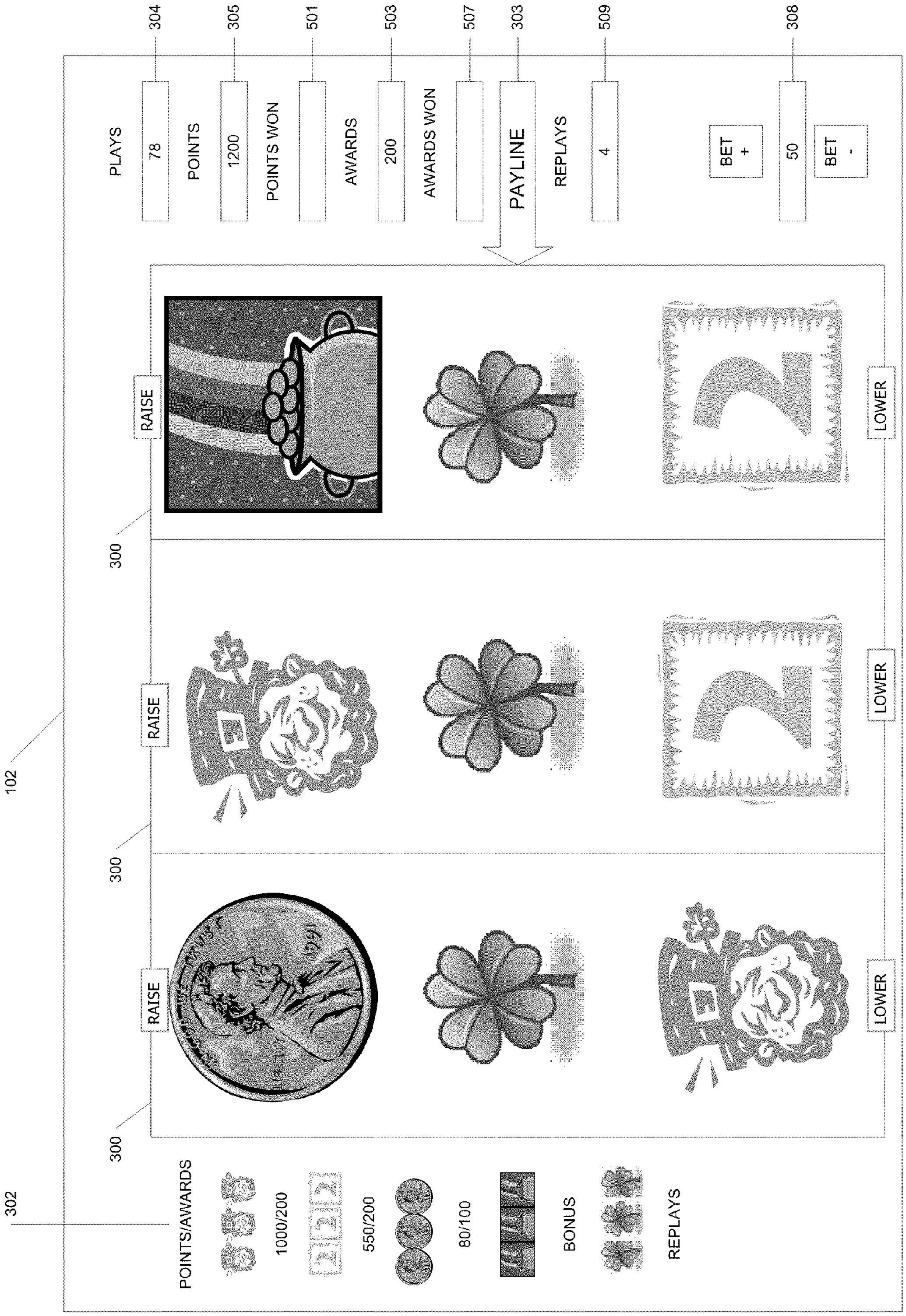
FIG. 6 shows the display of the skill-based redemption gaming machine in accordance with the present invention with a “Replay” combination.

FIG. 6 shows display 102 after the player has commenced game play and successfully nudged reels 300 into a replay configuration of three four-leaf clovers across payline 303, as indicated by paytable 302. In the preferred embodiment of the present invention, a replay award provides the player with one or more free replays of the gaming machine. Such replays are considered free because they present the player the opportunity to win additional points and awards without expending plays. The number of replays awarded to the player upon obtaining a replay combination varies with the number of credits wagered and is a function of the programming of gaming software 102.

As indicated in FIG. 6, prior to commencing play, the player has wagered 50 credits, as reflected by wager indicator 308. After play has been commenced, the value appearing in plays indicator 304 has been reduced by one, leaving 78 plays remaining. Points indicator 305 has been adjusted to reflect the 50 points wagered. Points won indicator 501 and awards won indicator 507 have been cleared pending the next winning combination. As shown by replays indicator 509, four replays have been awarded to the player.

After obtaining a replay combination, as shown in FIG. 6, game plays are automatically advanced by gaming software 102 without the need for any further input from the player. In other words, the player's replays are consumed without the need to depress play button 211, as is typically necessary to commence play.

For each replay, the amount of total points available is decremented by the amount last wagered by the player (i.e., 50 in the embodiment illustrated by FIG. 6). A determination is made as to whether the replay resulted in a winning combination with corresponding points and awards added to the total points and the total awards, respectively. For example, referring to FIG. 7, the first replay has resulted in a configuration of three pennies across payline 303, resulting in an award of 80 points and 100 awards, as reflected in points won indicator 501 and awards won indicator 507.

Figure 7:
FIG. 7 shows the display of the skill-based redemption gaming machine in accordance with the present invention during a first replay sequence resulting in a winning combination.

Referring still to FIG. 7, plays indicator 304 has not been decremented as all replays are free. Points indicator 305 has been adjusted to reflect a total of 1230 points (i.e., 1200 points prior to the replay minus 50 points wagered plus 80 points won). Similarly, awards indicator 503 has been adjusted to reflect a total of 300 awards (i.e., 200 awards prior to the replay plus 100 awards won). Replays indicator 509 has been decremented by one to reflect the one replay expended and the three replays remaining. The total amount awards achieved during a set of replay spins is governed by gaming software 102, based upon applicable law.

Figure 8:
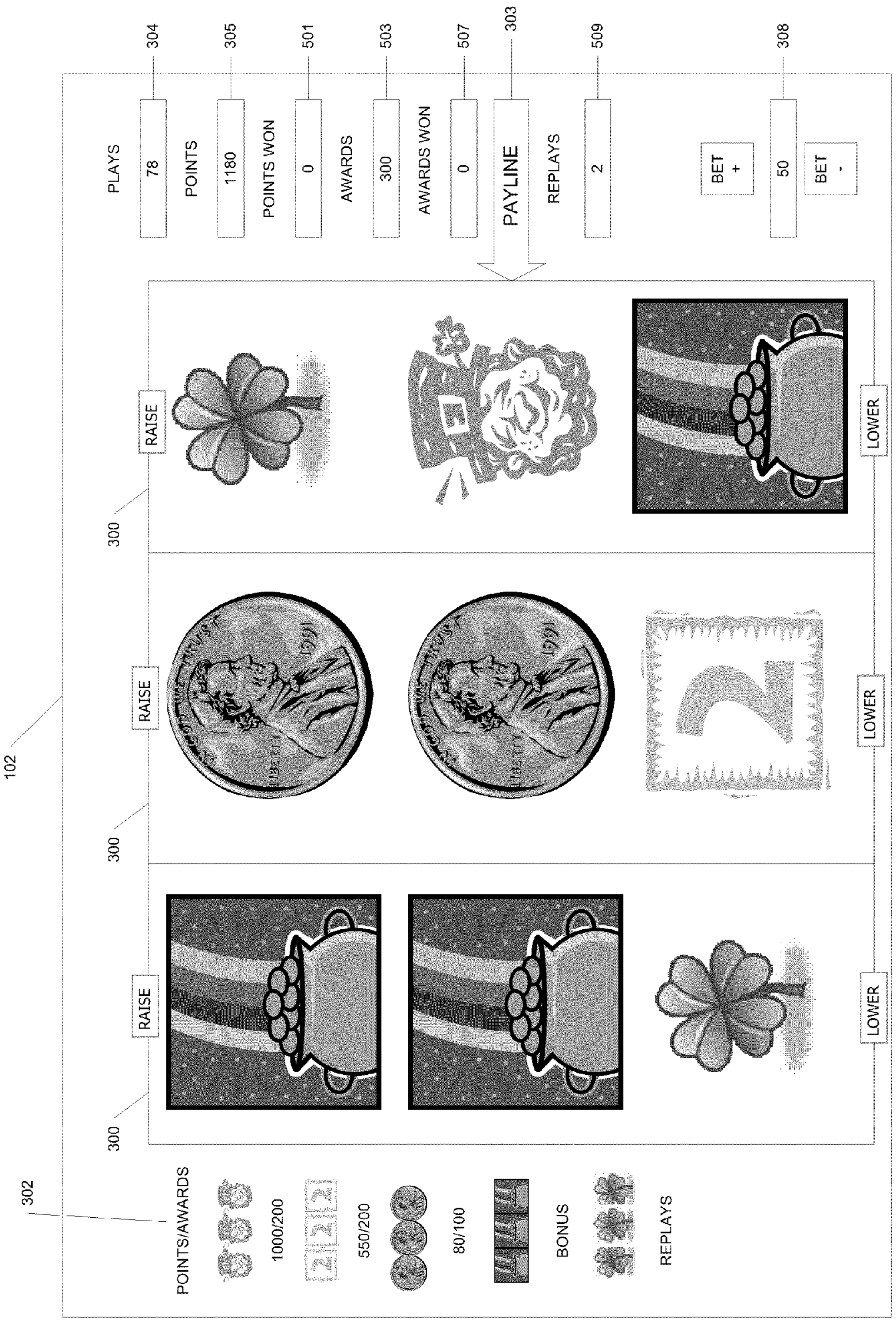
FIG. 8 shows the display of the skill-based redemption gaming machine in accordance with the present invention during a second replay sequence resulting in a losing combination.

Processor 106, executing gaming software 102, continues to automatically run game plays until all replays have been expended. FIG. 8 shows an exemplary configuration of display 102 after a second replay of the game in accordance with the present invention. Again, plays indicator 304 has not been decremented while replays indicator 509 has been adjusted to reflect the execution of another replay. In the configuration of FIG. 8, the player did not obtain a winning combination as the symbols across payline 303 do not match any of the winning combinations of symbols set out in paytable 302. Accordingly, points won indicator 501 and awards won indicator 507 display "0". Points indicator 305 has been reduced by 50 points to 1180 to reflect the 50 points wagered on the replay.

Once all replays previously awarded have been exhausted, gaming machine 101 returns to normal operation. The player may continue play within the confines of his or her available plays and points, as reflected by plays indicator 304 and points indicator 305, respectively. If the player elects to continue playing, he or she selects a number of points to wager and commences play.

Figure 9:
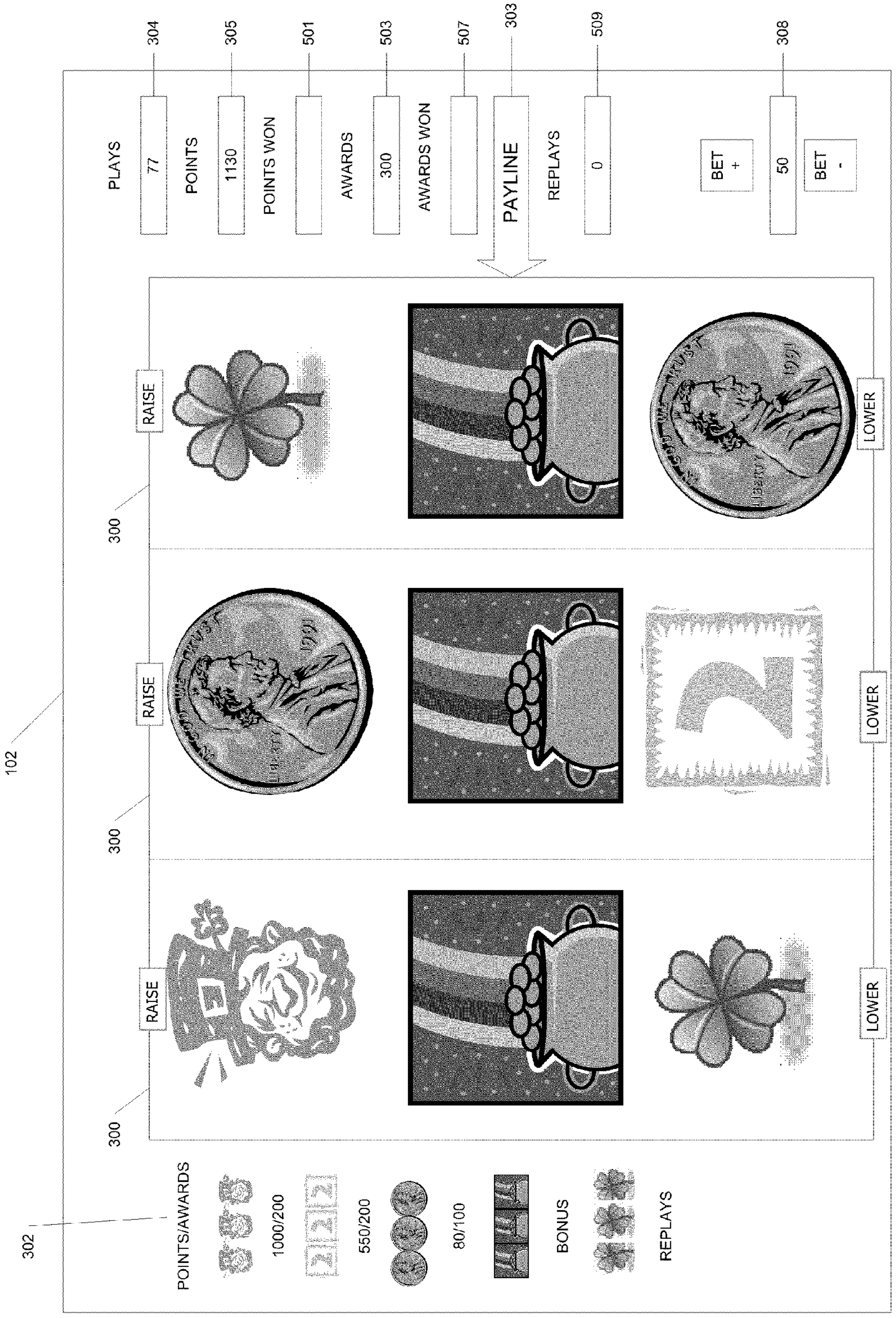
FIG. 9 shows the display of the skill-based redemption gaming machine in accordance with the present invention with a “Bonus” combination.

FIG. 9 shows display 102 after the player has commenced game play and successfully nudged reels 300 into a bonus configuration of three pots of gold across payline 303, as indicated by paytable 302. In the preferred embodiment of the present invention, a bonus award causes a "bonus round" to be depicted on display 102. The manner in which the bonus round operates is described in greater detail, below, in reference to FIG. 10.

Referring still to FIG. 9, plays indicator 304 has been decremented to reflect 77 remaining plays. Points indicator 305 indicates the 1030 points remaining after the player has wagered 50 points, as shown in wager indicator 308.

Figure 10:
FIG. 10 shows the bonus game display of the skill-based redemption gaming machine in accordance with the present invention.

FIG. 10 depicts the bonus round described in reference to FIG. 9, above. Bonus rounds of this type are typical for skill-based redemption games such as the one of the present invention. In application, the player is given the opportunity to select one or more bonus round symbols 1001 depicted on display 102. In the preferred embodiment, display 102 is a touch-screen monitor and the player merely touches the screen to make his or her selection. However, any other means of allowing the player to make a selection as is know in the art may be employed.

Once the player makes his or her selection by touching a bonus round symbol 1001, processor 106, running gaming software 102, causes display 102 to reveal a prize amount comprising a combination of points and awards. The process of revealing the prize amount is known in the art and is not described herein.

Once revealed, the value of the points and awards won by the player are displayed in points won indicator 501 and awards won indicator 507, respectively. In the example depicted by FIG. 10, the player has revealed one bonus symbol and has been awarded 1000 points and 200 awards. The bonus round can consist of single or multiple selections of bonus round symbols 1001. In actuality, the bonus round is nothing more than an alternate method of awarding points and awards to the player to that described above. The bonus round adds variety to the, thereby increasing player enjoyment.

Figure 11:
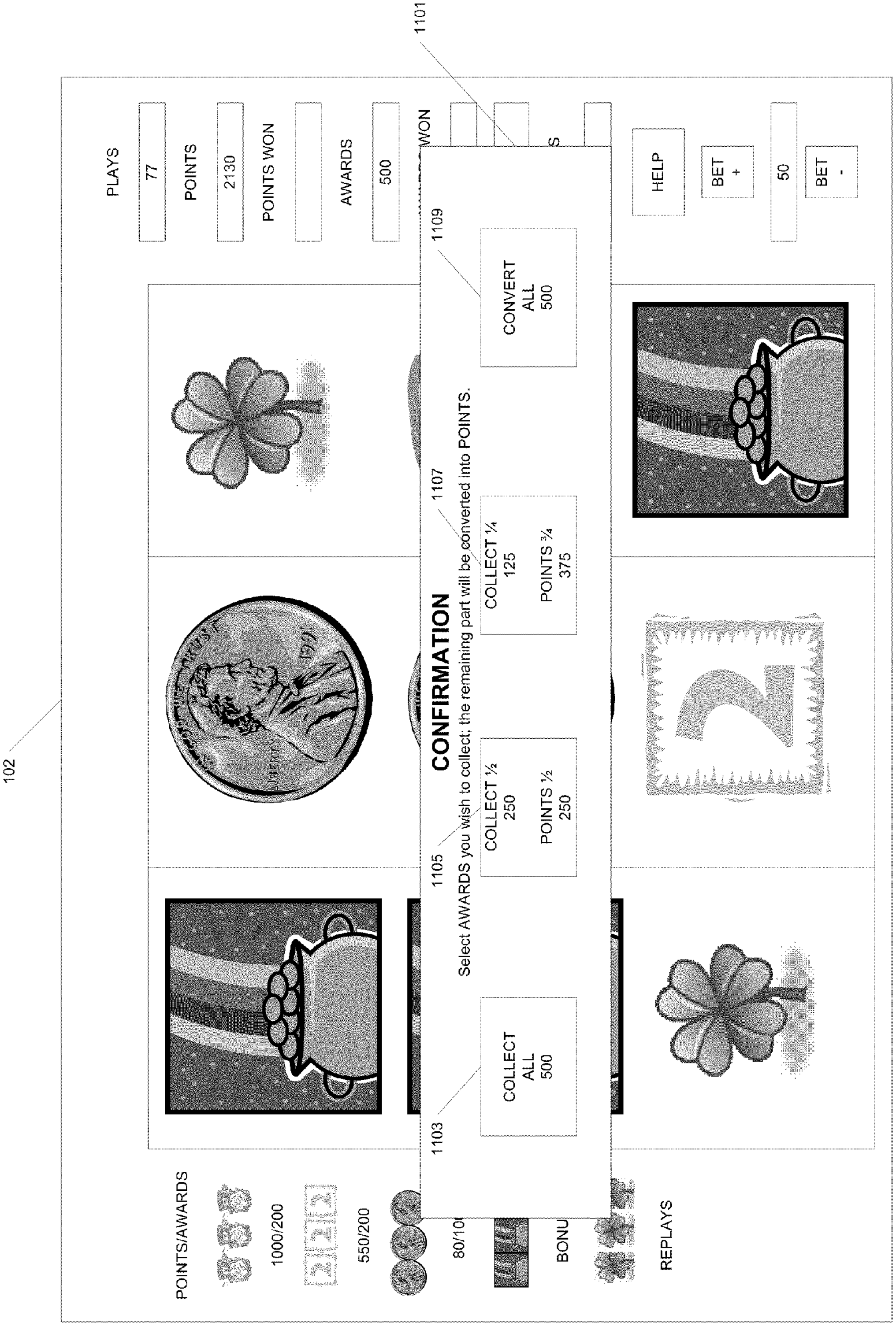
FIG. 11 shows the awards option screen of the skill-based redemption gaming machine in accordance with the present invention after the “Print Ticket” button has been depressed.

FIG. 11 depicts display 102 after the player has depressed cash-out button 213. In so doing, the player has indicated his or her intention to discontinue play of the gaming machine 101 and collect any available awards. As described above, only the awards that are accumulated by the player are exchangeable for non-cash prizes at the end of the game. A value is assigned to the awards such that they may be redeemed for prizes. The greater the number of awards the player has won, the greater the value of the prize for which said awards may be redeemed. The value of the awards is determined by the applicable law regarding the value of prizes that may be paid out in a skill-based redemption game.

Once the player has indicated his or her desire to redeem the awards he or she has previously won, confirmation screen 1101 is generated upon the graphics theretofore presented on display 102. Confirmation screen 1101 presents the player with several options. First, the player may elect to collect all of his or her awards by selecting collect all button 1103. Such action will cause ticket printer 217 to dispense a ticket for the entire amount of awards theretofore accumulated by the player. In the embodiment illustrated by FIG. 10, ticket printer 217 would dispense a ticket for 500 awards. Second, the player may elect to collect a portion of the awards and convert the balance to points for future play by selecting collect ½ button 1105 or collect ¼ button 1107. Finally, the player may elect to covert all of his or her awards to points by selecting convert all button 1109.

The player's decision as to which button to select is motivated by two interests: awards to be redeemed for prizes and additional points to be wagered during continued play of the game. The more awards the player redeems, the fewer points he or she will have available to wager on future play. Likewise, the greater the number of awards the player converts, the smaller the awards the player will have to redeem.

Figure 12:
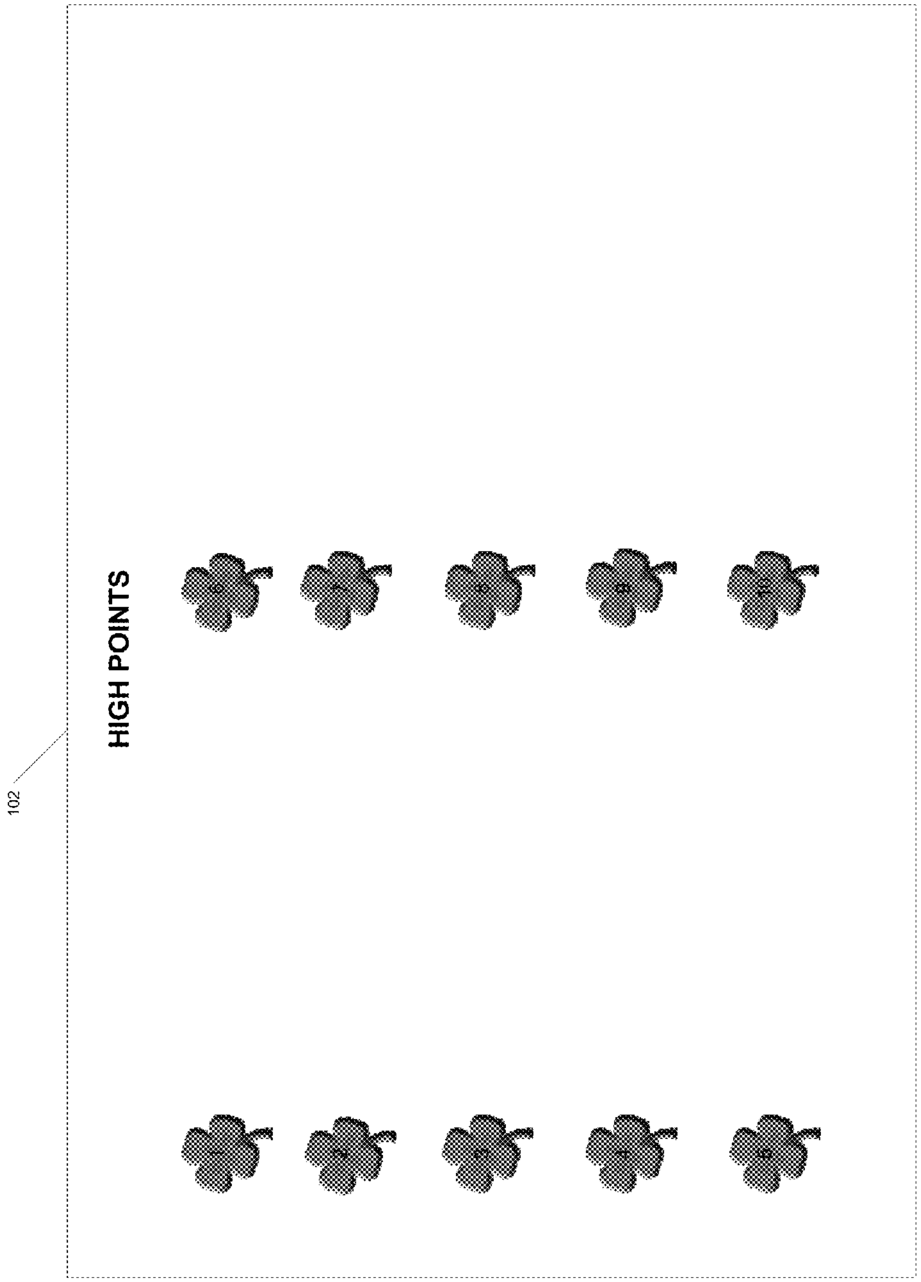
FIG. 12 shows the high score display of the skill-based redemption gaming machine in accordance with the present invention.

In one embodiment of the present invention, gaming machine 101 includes a High Points feature, as illustrated by FIG. 12. The High Points feature functions in a manner similar to that used in arcade-type video games in which a certain number of the highest scores obtained by previous players are displayed on a High Points screen. The actual number of scores displayed is arbitrary and is purely a function of game design. In the embodiment illustrated in FIG. 12, the top ten scores are displayed.

When play is terminated, processor 106 compares the number of points the player has accumulated, as reflected in points indicator 305, to the number of points accumulated by previous players stored in memory 108. All players' scores are then ranked. If a player's points total is one of the top ten scores, he or she is given the opportunity to record his or her name or initials in the numbered space corresponding to the ranking. For example, if a player obtains the sixth highest point total, he or she may enter his or initials in space 6. Such a feature give the player an incentive to continue accumulating points, either by adding additional consideration or converting previously-won points to awards, as described in reference to FIG. 11, above.

Figure 13:
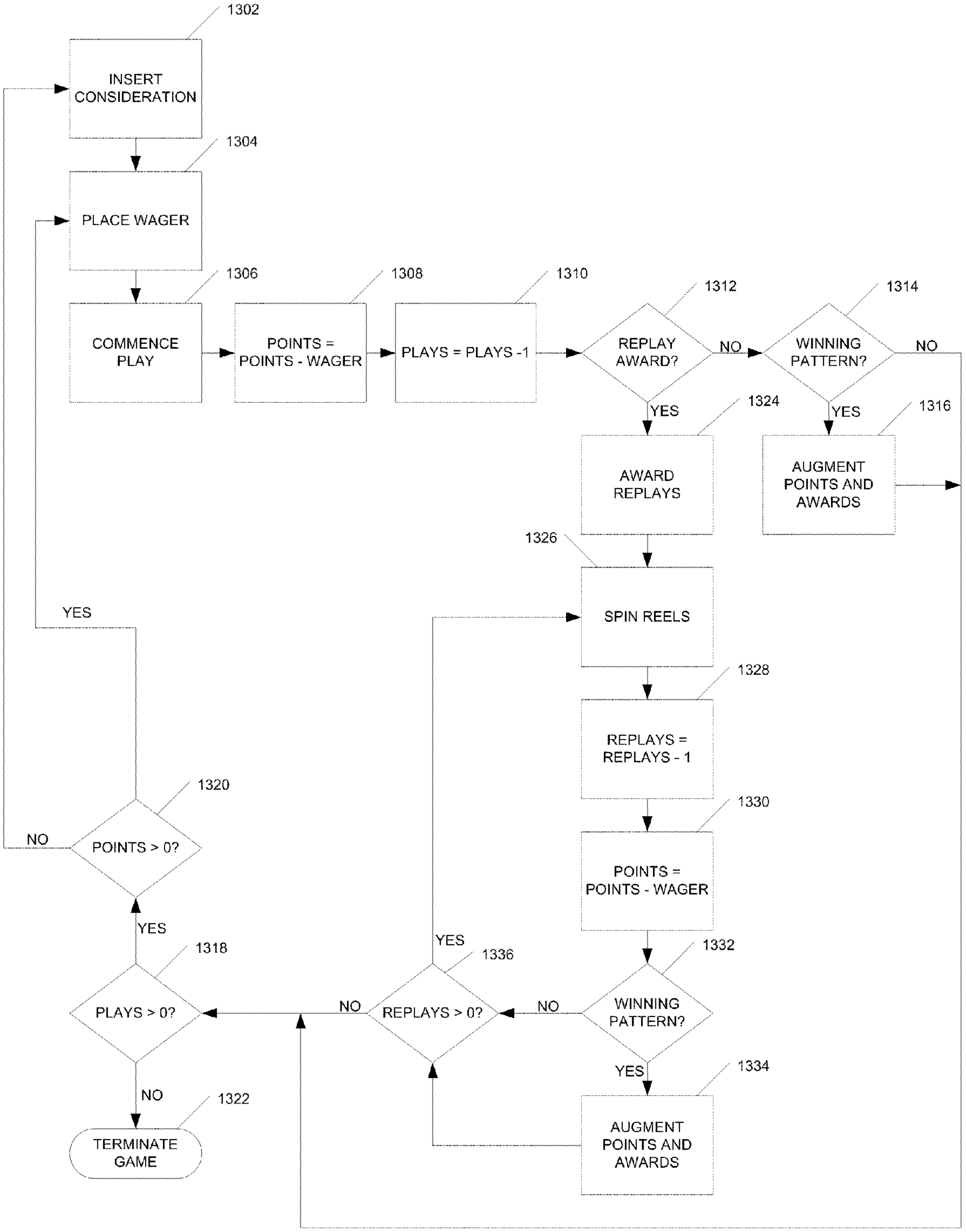
FIG. 13 is a process flowchart illustrating a the play of a skill-based redemption game played in accordance with the present invention.

FIG. 13 shows one gaming method embodiment implemented by the gaming system 100 shown in FIG. 1. The flow diagram of FIG. 13 shows the architecture, functionality, and operation of a possible implementation of gaming system 100. In this regard, each block represents a module, segment, or portion of code, which comprises one or more executable instructions for implementing the specified logical function(s). It should also be noted that in some alternative implementations, the functions noted in the blocks may occur out of the order noted in FIG. 13. For example, two blocks shown in succession in FIG. 13 may in fact be executed substantially concurrently or the blocks may sometimes be executed in the reverse order, depending upon the functionality involved, as will be further clarified hereinbelow.

As described with reference to FIG. 13, the player initiates game play by depositing consideration into the gaming machine via bill acceptor 215 causing the corresponding number of plays and points to be displayed in plays indicator 304 and points indicator 305, respectively (step 1302). The player then selects a number of points to wager using wager increase key 306 and/or wager decrease key 307 (step 1304). The number of points selected to wager may not exceed the number of points available. After indicating a wager, the player commences play of the gaming machine by depressing play button 211 (step 1306). The total points available is decremented by the amount of the wager (step 1308) and the number of plays is decremented by one (step 1310).

Upon commencing play, game reels 300 are set in motion and come to rest, either after a certain amount of time or via player interaction. Thereupon, a check is made to determine if reel symbols 301 aligned along payline 303 form a replay combination (step 1312). If a replay combination is not formed, a check is made to determine if the alignment of symbols forms a winning pattern (1314). A winning pattern along payline 303 causes the number of points and awards indicated by paytable 302 to be awarded to the player (step 1316). At this point, a check is made to ensure the number of plays remaining is greater than zero (step 1318). If no plays remain, the game terminates (step 1322). Otherwise, another check is made to ensure that the number of points remaining is greater than zero (step 1320). If additional points are available, the player may place another wager (step 1304). Otherwise, he or she must add additional consideration (step 1302).

If, however, a replay combination is formed (step 1312), the corresponding number of replays are awarded to the player and displayed in replays indicator 509 (step 1324). At this point, game play is initiated without further interaction from the player (step 1326) and the number of replays is decremented by one (step 1328) and the number of available points is decremented by the amount last wagered by the player (step 1330). Next, a determination is made as to whether the replay resulted in a winning combination (step 1332). If so, the number of points and awards indicated by paytable 302 is awarded to the player (step 1334). Otherwise, a check is made to ensure the number of replays remaining is greater than zero (step 1336). If replays remain, the process continues until all replays are exhausted (step 1326) at which point the game returns to normal operation and a check is made to ensure that the number of plays remaining is greater than zero (step 1318).

It should be understood that the foregoing descriptions merely relate to illustrative, exemplary embodiments of the invention. Therefore, it should also be understood that various modifications may be made to the exemplary embodiments described herein within the scope of the invention, which will be recognized by one of ordinary skill in the art in light of the disclosure herein. Moreover, it should be understood that exemplary embodiments of the invention, such as those discussed above, can be implemented in various manners and with various techniques, such as but not limited to, manually, automatically, by execution of computer software, by implementation of electronic and/or discrete components, etc., which will also be recognized by one of ordinary skill in the art in light of the disclosure herein.

What is claimed is:

1. An electronic skill-based redemption game comprising:

a display;

a computer processor, said processor programmed to generate a plurality of reels on the display, each of the plurality of reels having a plurality of symbols;

a memory capable of storing a plurality of software instructions, at least one winning combination of symbols and paytable information corresponding to the at least one winning combination of symbols;

a wager input interface for accepting consideration from a player and said computer processor further programmed to provide the player with a plays value and a points value responsive thereto;

means for accepting a wager from the player in an amount up to an available number of points;

player controlled means for commencing play of the skill-based redemption game, upon activation of which the computer processor implements the following software instructions:

(i) decrementing the plays value by one and the points value by the amount of the wager;

(ii) simulating the rotation of the plurality of reels on the display by varying the position of the plurality of symbols on the plurality of reels;

(iii) providing compensation to the player in accordance with the paytable if a combination of multiple of said plurality of symbols wherein at least one of the plurality of symbols on each of the plurality of reels matches the at least one winning combination of symbols; and (iv) terminating further play of the skill-based redemption game if the plays value reaches zero.

2. The electronic skill-based redemption game of claim 1 wherein the compensation provided to the player is an awards amount.

3. The electronic skill-based redemption game of claim 2 further comprising player controlled cash-out means upon activation of which the player is given the option of converting a portion of the awards amount to additional points.

4. The electronic skill-based redemption game of claim 1 wherein the compensation provided to the player is a points amount.

5. The electronic skill-based redemption game of claim 1 wherein the compensation provided to the player is an opportunity to play a bonus round depicted on the display.

6. The electronic skill-based redemption game of claim 1 further comprising player controlled nudge means for altering the position of the plurality of symbols on the plurality of reels.

7. The electronic skill-based redemption game of claim 1 wherein the compensation awarded to the player is one or more replays.

8. The electronic skill-based redemption game of claim 7 wherein, for each replay awarded, play of the game is commenced without further input from the player.

9. The electronic skill-based redemption game of claim 7 wherein, for each replay, the plays value is not decremented while the points value is decremented by the amount of the most recent wager.

10. The electronic skill-based redemption game of claim 1 wherein said computer processor is further programmed to record and instruct said display to display one or more top points values theretofore obtained by players of the game.

11. A method of playing an electronic skill-based redemption game comprising:

generating a plurality of reels on a display, each of the plurality of reels having a plurality of symbols;

storing a plurality of software instructions, at least one winning combination of symbols and paytable information corresponding to the at least one winning combination of symbols in memory;

accepting consideration from a player and providing the player with a plays value and a points value;

accepting a wager from the player in an amount up to a number of points;

commencing play of the skill-based redemption game;

decrementing the plays value by one and the points value by the amount of the wager;

simulating the rotation of the plurality of reels on the display by varying the position of the plurality of symbols on the plurality of reels;

providing compensation to the player in accordance with the paytable if a combination of multiple of said plurality of symbols wherein at least one of the plurality of symbols on each of the plurality of reels matches the at least one winning combination of symbols; and terminating further play of the skill-based redemption game if the plays value reaches zero.

12. The method of playing an electronic skill-based redemption game of claim 11 wherein the compensation provided to the player is an awards amount.

13. The method of playing an electronic skill-based redemption game of claim 12 further comprising providing player controlled cash-out means upon activation of which the player is given the option of converting a portion of the awards amount to additional points.

14. The method of playing an electronic skill-based redemption game of claim 11 wherein the compensation provided to the player is a points amount.

15. The method of playing an electronic skill-based redemption game of claim 11 wherein the compensation provided to the player is an opportunity to play a bonus round depicted on the display.

16. The method of playing an electronic skill-based redemption game of claim 11 further comprising providing player controlled nudge means for altering the position of the plurality of symbols on the plurality of reels.

17. The method of playing an electronic skill-based redemption game of claim 11 wherein the compensation awarded to the player is one or more replays.

18. The method of playing an electronic skill-based redemption game of claim 17 wherein, for each replay awarded, commencing play of the game without further input from the player.

19. The method of playing an electronic skill-based redemption game of claim 17 wherein, for each replay, not decrementing the plays value while decrementing the points value by the amount of the most recent wager.

20. The method of playing an electronic skill-based redemption game of claim 1 further comprising recording and displaying one or more of the top points values theretofore obtained by players of the game.

* * * * *